July 26, 1938.　　　　G. LAVINE　　　　2,124,580
EMULSIFYING DEVICE
Filed Dec. 13, 1934
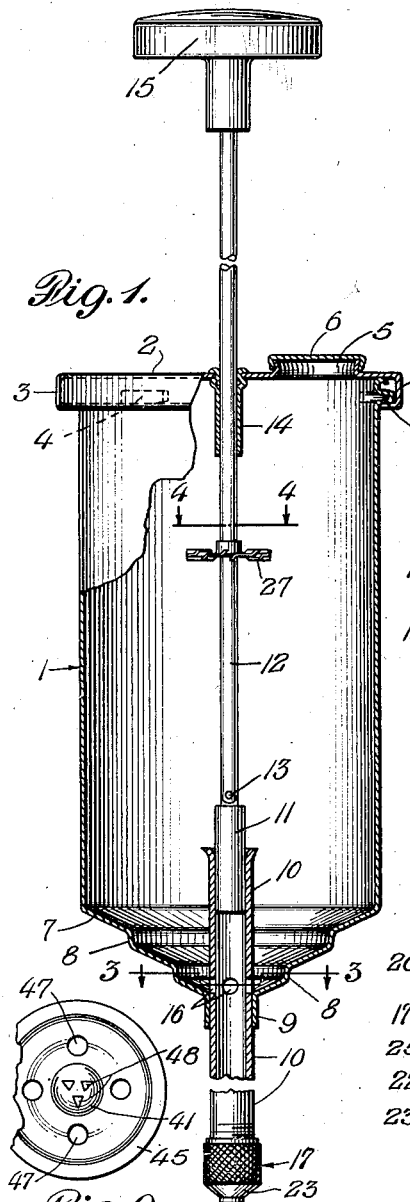
Inventor
George Lavine
By Lowry Lowry
Attorneys Patented July 26, 1938

2,124,580

UNITED STATES PATENT OFFICE 2,124,580

EMULSIFYING DEVICE

George Lavine, Brooklyn, N. Y., assignor to Oakdale Contracting Company, Inc., New York, N. Y., a corporation of New York Application December 13, 1934, Serial No. 757,399

11 Claims. (Cl. 99—267)

The present invention relates to emulsifying devices and has particular relation to devices of this character which are adapted to emulsify liquids or liquids with solids or semi-solids such as fats.

One of the objects of the present invention is to provide a device of the character described which is simple and compact in construction and of the portable type intended for household use in mixing liquids such as milk, water or other liquids, with oils, fats, or other substances to produce creamy salad dressings, liniments, etc., and which may also be employed in mixing cocktails and other beverages when it is desired to obtain a better blending than can be obtained by mixing or shaking.

Another object of the invention is to provide a device of the character described in which the liquids are thoroughly blended and expelled from the device under pressure.

Another object of the invention is to provide a device of the character described having a simple and efficient valve structure through which the mixture is expelled and which thoroughly breaks up and mixes the liquid during its passage therethrough.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawing means for carrying the same into practical effect, without limiting the improvements, in their useful applications, to the particular constructions which, for the purpose of explanation, have been made the subject of illustration.

In said drawing:

Figure 1 is a view partly in side elevation and partly in vertical section of an emulsifying device constructed in accordance with the present invention.

Figure 2 is a bottom plan view of the structure shown in Figure 1,

Figure 3 is an enlarged horizontal section taken on line 3—3 of Figure 1,

Figure 4 is a similar view taken on line 4—4 of Figure 1,

Figure 5 is an enlarged vertical sectional view of the valve structure shown in Figure 1, Figure 6 is a similar view of a modified form of valve structure, Figure 7 is a horizontal sectional view taken on line 7—7 of Figure 6, Figure 8 is an enlarged fragmentary vertical sectional view of still another form of valve structure, and Figure 9 is a plan view of a portion of the valve structure shown in Figure 8.

Referring to the drawing, an emulsifier constructed in accordance with the present invention is shown as comprising a cylindrical container 1, preferably of sheet metal, having a cover 2 at its upper end provided with downwardly and inwardly turned flanges 3 for engagement with inclined cam lugs 4 provided on the side walls of the container and cooperating therewith in the manner of a bayonet joint to securely hold the cover in position. The cover 2 is also provided with a filling opening 5 normally closed by a cap or other closure 6.

The container 1 is provided with a bottom 7 which is preferably formed with a plurality of concentric corrugations or steps 8 which are designed to nest within receptacles of different sizes such as milk bottles, glasses or cocktail shakers, while the liquid is being delivered thereto. The bottom 7 is also provided with a centrally disposed nipple 9 in which a compression cylinder 10 is suitably fixed, for example as by soldering. This cylinder is fixed to the nipple 9 substantially midway of the length of the former so that the upper portion of the cylinder extends a substantial distance into the container and its lower portion projects a convenient and desired distance outside of the container. Mounted within the compression cylinder 10 for vertical reciprocation is a piston 11 which is loosely connected with the lower end of a rod 12 by means of a pivot 13. This rod extends vertically and axially through the container 1 and through a sleeve 14 carried by the cover 2 and is provided with an operating handle 15 at its upper end. The compression cylinder 10 is provided with a plurality of ports or openings 16 adjacent to the bottom of the container through which liquid in the container is drawn into the cylinder 10 upon the upward stroke of the plunger, as will hereinafter be described.

The lower end of the compression cylinder 10 is provided with a one-way valve, indicated generally at 17, which is closed during the upward movement of the plunger but which opens to permit the passage of the liquid or liquids by pressure developed by the piston 11 on its downward stroke. This valve preferably comprises a cup-shaped member 18 provided with a central opening 19 adapted to be closed by a valve plunger 20. The valve plunger 20 is urged towards its closing position by a spring 21 which encircles a stem portion 22 of the valve plunger between a cap 23, screw threaded onto the lower end of the cylinder 10, and a second cup-shaped member 24 carried by the valve plunger. The cap 23 defines a discharge chamber 23ᵃ into which the liquid passes from the compression cylinder 10 when the valve plunger 20 is unseated. The cup-shaped member 24 is disposed in opposed telescopic relation to the member 18 and is provided with a plurality of relatively small apertures 25 therein.

From the foregoing, it will be apparent that when the piston 11 is drawn upwardly by means of the rod 12 and handle 15, liquid within the container is drawn through the ports 16 into the compression cylinder 10. When the piston is forced downwardly a certain amount of the liquid in the cylinder 10 will be expelled back into the container through the ports 16 until the piston closes these ports. From this point on the downward movement of the piston 11 places the liquid remaining in the cylinder 10 under pressure which progressively increases until it is sufficient to unseat the valve plunger 20 against the action of the spring 21. As soon as the valve is thus unseated the liquid is forced under pressure against the sides of the cup-shaped member 18 which causes the liquid to swirl around within the space between the cup-shaped members 18 and 24, and thence through the apertures 25 into the discharge chamber 23ᵃ. From this latter chamber the liquid escapes through a discharge opening 26 disposed at the lower end of the cap 23. The degree of pressure required to unseat the valve plunger 20 to permit the discharge of the liquid as above described, may be regulated by varying the threaded engagement of cap 23 relative to compression cylinder 10, said cap preferably being knurled on its exterior surface for this purpose. It will be seen that the liquid travels an irregular course from the container until it is finally expelled through the opening 26, first, through the ports 16, and then through the valve opening 19, then through the apertures 25, and thence through the discharge opening 26 into any desired receptacle. This devious course of the liquids and pressure to which the same are subjected causes the liquids to be thoroughly mixed or emulsified at the time of discharge.

If desired, as agitator member 27 of any desired type or size may be mounted on the rod 12 to agitate the liquids in the container 1 during the reciprocation of the rod 12 and piston 10. Said agitator preferably comprises a plurality of blades 28 adapted to impart a swirling action to the liquids in the container when the rod 12 is reciprocated. The action of the agitator together with the flow of the liquids back and forth through the ports 16 insures that the liquids are thoroughly intermingled prior to their passage through the valve 17.

In Figure 6 there is shown a modified form of valve structure. In this particular construction the lower end of the cylinder 10 is closed by a valve 29 having a cylindrical portion 30 adapted to extend into and slidably engage the walls of the lower portion of the cylinder 10 and with a collar 31 adapted to seat against the lower end of the cylinder 10, the edge of which is slightly beveled as shown. This valve is urged towards its closed position by means of a spring 32 which encircles a stem portion 33 between the collar 31 and a cap 34 which is threaded onto the lower end of the cylinder 10. This cap is also provided with a discharge opening 35 and may be adjusted upwardly or downwardly in order to regulate the tension of the spring 32, as described in connection with the valve 17. The cylindrical portion 30 of the valve 29 is provided with a plurality of circumferentially arranged vertically extending relatively small slots which are preferably slightly tapered or channels 36 which are closed by the walls of the compression cylinder when the valve occupies its seated position. However, when pressure is developed within the cylinder 10, sufficient to unseat the valve 29 the lower portions of slots 36 are moved beyond the lower end of the cylinder 10, thereby establishing communication between the cylinder 10, discharge chamber 34ᵃ and discharge opening 35, whereby the liquid is discharged in relatively fine streams or jets under pressure through the vertically extending slots 36 while being expelled from the cylinder 10 against the collar 31, thence in a swirling action against the wall of the discharge chamber 34, which completes the emulsification and blending of the liquids, which then flow to the discharge opening 35.

If desired the valve members 20 and 41 illustrated in Figs. 5 and 8 may be made integrally with the cup-shaped members 24 and 45 respectively.

In Figs. 8 and 9 there is shown still another form of valve structure. This valve preferably comprises a cup-shaped member 39 which is secured within the lower end of the cylinder 10 and is provided with a centrally disposed opening 40 adapted to be closed by a ball valve member 41. The ball valve member 41 is urged toward its seated position by spring 42 which encircles a stem portion 43 of the ball valve between a cap 44 threaded on the lower end of the compression cylinder 10, and a second cup-shaped member 45 carried by the stem 43. The cap 44 also defines a discharge chamber 46 into which the liquids pass from the compression cylinder 10 when the ball valve member 41 is unseated by the pressure of the liquid within the cylinder 10. The cup-shaped member 45 is disposed in opposed telescopic relation to the member 39, and is provided with a plurality of relatively small apertures 47 therein, which are radially spaced so as to be disposed opposite the projections 48. The ball valve member 41 is preferably provided with a plurality of spaced projections 48 between which the liquids are forced in relatively small streams or jets against the wall of the cup-shaped member 45, when the ball valve 41 is unseated by the downward movement of the piston 11.

As in the structures hereinbefore described the passage of the liquids from the compression cylinder 10 through the valve opening 40, spaces between the projections 48, under pressure in relatively fine streams or jets against the wall of the cup-shaped member 45, and the ensuing swirling action breaks up and finely divides and emulsifies or mixes the liquids prior to their discharge into the receptacle.

If desired, the ball 41 may be provided with relatively small apertures instead of the projections 48, through which apertures the liquid passes in fine streams or jets for the purpose described.

The various valve structures above described are so constructed as to be automatically operated at a predetermined selective pressure which expels the liquid through the openings or channels in fine streams or jets against an opposing face which is at approximately right angles to the direction of said streams or jets, with sufficient force to finely divide or break up the particles of the liquid mixture thereby completing the thorough emulsification and/or blending of the component parts.

From the foregoing it will be apparent that I have provided a very simple, efficient and self-contained emulsifying device of the portable type, particularly adapted for household use.

Other modifications and changes in proportion and arrangement of the several necessary elements constituting the invention may be made by those skilled in the art without departing from the nature and scope of the invention as defined in the appended claims.

What is claimed is:

1. A portable emulsifying device of the shaker type comprising a cylindrical container closed at its upper end, a compression cylinder communicating through a wall of said container and provided with a port for establishing communication between said container and the interior of said cylinder, a check valve structure provided at the outer end of said cylinder, a piston mounted for reciprocation in said cylinder and having an actuating rod extending axially through the closed upper end of the container, said actuating rod being adapted for reciprocating said piston to draw liquid from said container into said cylinder through said port and to expel the same under pressure through said check valve structure in an emulsified condition axially of said compression cylinder.

2. A portable emulsifying device of the shaker type comprising a container closed at its upper end, a compression cylinder extending through the bottom of said container and provided with a port for establishing communication between said container and the interior of said cylinder, a check valve structure provided in the lower end of said cylinder, a piston mounted for reciprocation in said cylinder and having an actuating rod extending axially through the closed upper end of the container, said actuating rod being adapted for reciprocating said piston to draw liquid from said container into said cylinder through said port and to expel the same under pressure through said check valve structure in an emulsified condition axially of said compression cylinder.

3. An emulsifying device of the shaker type comprising a container having a removable cover, a compression cylinder communicating through a wall of said container and provided with a port for establishing communication between said container and the interior of said cylinder, a check valve structure provided at the outer end of said cylinder, a piston mounted for reciprocation in said cylinder, a rod pivotally connected with said piston and extending through said cover for reciprocating said piston to draw liquids from said container into said cylinder through said port and to expel the same under pressure through said check valve structure in an emulsified condition, and an agitator carried by said rod for intermingling the liquids prior to their passage into said cylinder, said agitator having a serrated periphery to promote a swirling action of the liquids to be emulsified.

4. An emulsifying device of the shaker type comprising a cylindrical container closed at its upper end, a compression cylinder communicating through the bottom of said container and provided with a port for establishing communication between said container and the interior of said cylinder, a check valve structure provided in the lower end of said cylinder, a piston mounted for reciprocation in said cylinder, and means for reciprocating said piston to draw liquid from said container into said cylinder through said port and to expel the same under pressure through said check valve structure in an emulsified condition, the bottom of said container being of conical formation and having spaced concentric means for engaging receptacles of different sizes to nest the device against displacement relative to a said receptacle when dispensing its contents thereinto.

5. An emulsifying device of the shaker type comprising a cylindrical container closed at its upper end, a compression cylinder communicating through the bottom of said container and provided with a port for establishing communication between said container and the interior of said cylinder, a check valve structure provided in the lower end of said cylinder, a piston mounted for reciprocation in the upper end of said cylinder, and means for reciprocating said piston to draw liquid from said container into said cylinder through said port and to expel the same under pressure through said check valve structure in an emulsified condition, the bottom of said container being of conical formation and provided with a plurality of spaced concentric annular shoulders of varying diameters for engagement with receptacles of different sizes to nest the device against displacement relative to a said receptacle when dispensing its contents thereinto.

6. A portable emulsifying device of the shaker type comprising a container closed at its upper end, a compression cylinder communicating through a wall of said container and provided with a port for establishing communication between said container and the interior of said cylinder, a check valve structure provided at the outer end of said cylinder, a piston mounted for reciprocation in the upper end of said cylinder and having an actuating rod extending axially through the closed upper end of the container, said actuating rod being adapted for reciprocating said piston to draw liquid from said container into said cylinder through said port and to expel the same under pressure through said check valve structure in an emulsified condition axially of said compression cylinder, a spring for urging said check valve toward a seated position; and means for adjusting the tension of said spring to control the pressure at which the liquid is expelled through said valve.

7. An emulsifying device of the shaker type comprising a container closed at its upper end, a compression cylinder communicating through a wall of said container and provided with a port for establishing communication between said container and the interior of said cylinder, a needle valve mechanism provided at the outer end of said cylinder, a piston mounted for reciprocation in said cylinder and means for reciprocating said piston to draw liquid from said container into said cylinder through said port and to expel the same under pressure through said valve mechanism in an emulsified condition, said valve mechanism including a discharge opening and a plurality of relatively small orifices through which the liquid passes toward said discharge opening.

8. An emulsifying device of the shaker type comprising a container closed at its upper end, a compression cylinder communicating through a wall of said container and provided with ports for establishing communication between said container and the interior of said cylinder, a needle valve mechanism provided at the outer end of said cylinder, a piston mounted for reciprocation in said cylinder, and means for reciprocating said piston to draw liquid from said container into said cylinder through said ports and to expel the same under pressure through said valve mechanism in an emulsified condition, said valve mechanism including a discharge chamber having a discharge opening therefrom and a plurality of relatively small passages through which the liquid passes toward said discharge opening.

9. An emulsifying device comprising a container, a compression cylinder communicating through a wall of said container and provided with a port for establishing communication between said container and the interior of said cylinder, a needle valve mechanism provided at the outer end of said cylinder, said needle valve mechanism including a discharge chamber having a discharge opening therein and a needle valve plunger having a plurality of relatively small passageways therein through which the liquid passes from said compression cylinder to said discharge chamber, a piston mounted for reciprocation in said cylinder, and means for reciprocating said piston to draw liquids from said container into said cylinder through said port and to expel the same under pressure through said needle valve mechanism in an emulsified condition.

10. A portable emulsifying device of the shaker type of the character defined in claim 1 wherein said check valve structure comprises a slide valve mechanism provided at the outer end of the cylinder, said slide valve mechanism including a valve plunger having a cylindrical portion slidably mounted within the outer end of the compression cylinder and having a plurality of relatively small channels therein, a collar portion adapted to seat against the outer end of the said cylinder, and a spring for normally urging said valve plunger toward its seated position.

11. A portable emulsifying device of the shaker type of the character defined in claim 1 wherein said check valve structure comprises a ball valve mechanism provided at the outer end of the cylinder, said ball valve mechanism including a ball valve member having relatively small passageways therein through which the liquid passes when said ball valve member is unseated, and a spring for normally urging said ball valve member toward its seated position.

GEORGE LAVINE.